United States Patent
Imura et al.

[19]

[11] Patent Number: 5,918,078
[45] Date of Patent: Jun. 29, 1999

[54] LENS DRIVING DEVICE

[75] Inventors: Yoshio Imura; Hideki Kanbayashi, both of Kawasaki, Japan

[73] Assignee: Nikon Corporation, Tokyo, Japan

[21] Appl. No.: 08/901,900

[22] Filed: Jul. 29, 1997

[30] Foreign Application Priority Data

Sep. 6, 1996 [JP] Japan .................................. 8-236691
Sep. 6, 1996 [JP] Japan .................................. 8-236692

[51] Int. Cl.⁶ .................................................. G03B 3/00
[52] U.S. Cl. ........................ 396/137; 396/103; 396/131
[58] Field of Search .................... 396/103, 131, 396/137

[56] References Cited

U.S. PATENT DOCUMENTS

| | | | |
|---|---|---|---|
| 4,724,454 | 2/1988 | Misawa | 396/137 |
| 4,845,521 | 7/1989 | Akashi | 396/137 |
| 4,851,869 | 7/1989 | Ishimaru et al. | 396/131 |
| 4,933,701 | 6/1990 | Matsuyama | 396/137 |
| 5,177,524 | 1/1993 | Tanaka | 396/137 |
| 5,229,800 | 7/1993 | Kanno et al. | 396/137 |
| 5,572,373 | 11/1996 | Imanari et al. | 396/137 |
| 5,583,602 | 12/1996 | Yamamoto | 396/137 |
| 5,708,872 | 1/1998 | Fukino | 396/137 |

*Primary Examiner*—Russell Adams
*Attorney, Agent, or Firm*—Morgan, Lewis & Bockius LLP

[57] ABSTRACT

A lens driving device is disclosed, whereby it is made unnecessary for a user side to determine focusing when focusing is to be performed by an operation ring in a manual preference automatic focusing mode. The lens driving device includes an operation ring rotated for performing automatic focusing, a rotary encoder for detecting the operation amount of the operation ring, a motor for performing lens driving according to an operation amount detected by the rotary encoder, a body side CPU for detecting a defocusing amount at least during lens driving and a lens side CPU for forcibly stopping the lens driving of the motor when a defocusing amount detected by the body side CPU becomes equal to a preset value or lower.

5 Claims, 8 Drawing Sheets

LENS DRIVING DEVICE

This application claims the benefit of Japanese Application, Nos. 8-236691 and 8-236692 which are hereby incorporated by reference.

BACKGROUND OF THE INVENTION

1. Field of the Invention

The present invention relates to a lens driving device for performing lens driving.

2. Description of the Related Art

A camera capable of performing manual preference automatic focusing has conventionally been known.

Manual preference automatic focusing is a system for driving a lens according to the operation amount of an operation ring when the operation ring is operated in a mode which enables automatic focusing. In other words, when manual preference automatic focusing is set for the camera, not only automatic focusing but also, if necessary, manual focusing can be performed.

However, in case of the conventional camera, when focusing was performed by the operation ring in a manual preference automatic focusing mode, in order to determine whether a focus was adjusted or not, there has been no way available other than performing an observation while looking a subject on a finder screen or an indicator for focus displaying.

In addition, in the conventional camera, a special actuator was necessary for switching from automatic focusing to manual focusing in the manual preference automatic focusing mode.

For switching by such an actuator, not only a switching time is long but also the mechanism of a lens barrel becomes complex corresponding to an amount equivalent to the addition of the actuator.

SUMMARY OF THE INVENTION

The present invention was made with the foregoing in mind and it is a first object of the invention to provide a lens driving device which makes it unnecessary for a user side to determine whether a focus has been adjusted or not when focusing is performed by an operation ring in a manual preference automatic focusing mode.

It is a second object of the present invention to provide a lens driving device which is capable of smoothly performing switching between lens driving by automatic focusing and lens driving corresponding to the operation amount of the operation ring, in a mode (manual preference automatic focusing mode) for performing lens driving according to the operation amount of the operation ring when the operation ring is operated although automatic focusing is possible.

According to a first aspect of the present invention, the first object is achieved by a lens driving device which comprises an operation ring rotated for the purpose of focusing; operation amount detecting means for detecting the operation amount of the operation ring; a motor for performing lens driving according to an operation amount detected by the operation amount detecting means; defocusing amount detecting means for detecting a defocusing amount at least during the lens driving; and control means for forcibly stopping the lens driving performed by the motor when the defocusing amount detected by the defocusing amount detecting means reaches a preset value or lower.

According to another aspect of the present invention, the second object is achieved by a lens driving device for driving a lens depending on the operation amount of an operation ring when the operation ring is operated in a mode for enabling automatic focusing, which comprises detecting means for detecting the operation amount of the operation ring; and driving force generating means for driving the lens in order to perform automatic focusing in the foregoing mode and for driving the lens depending on an operation amount detected by the detecting means when the operation ring is operated in the foregoing mode.

BRIEF DESCRIPTION OF THE DRAWINGS

For a more complete understanding of the present invention and the advantages thereof, reference is now made to the following description taken in conjunction with the accompanying drawings.

DESCRIPTION OF THE PREFERRED EMBODIMENTS

The preferred embodiments of the present invention will be described below with reference to the accompanying drawings.

Figure 1:
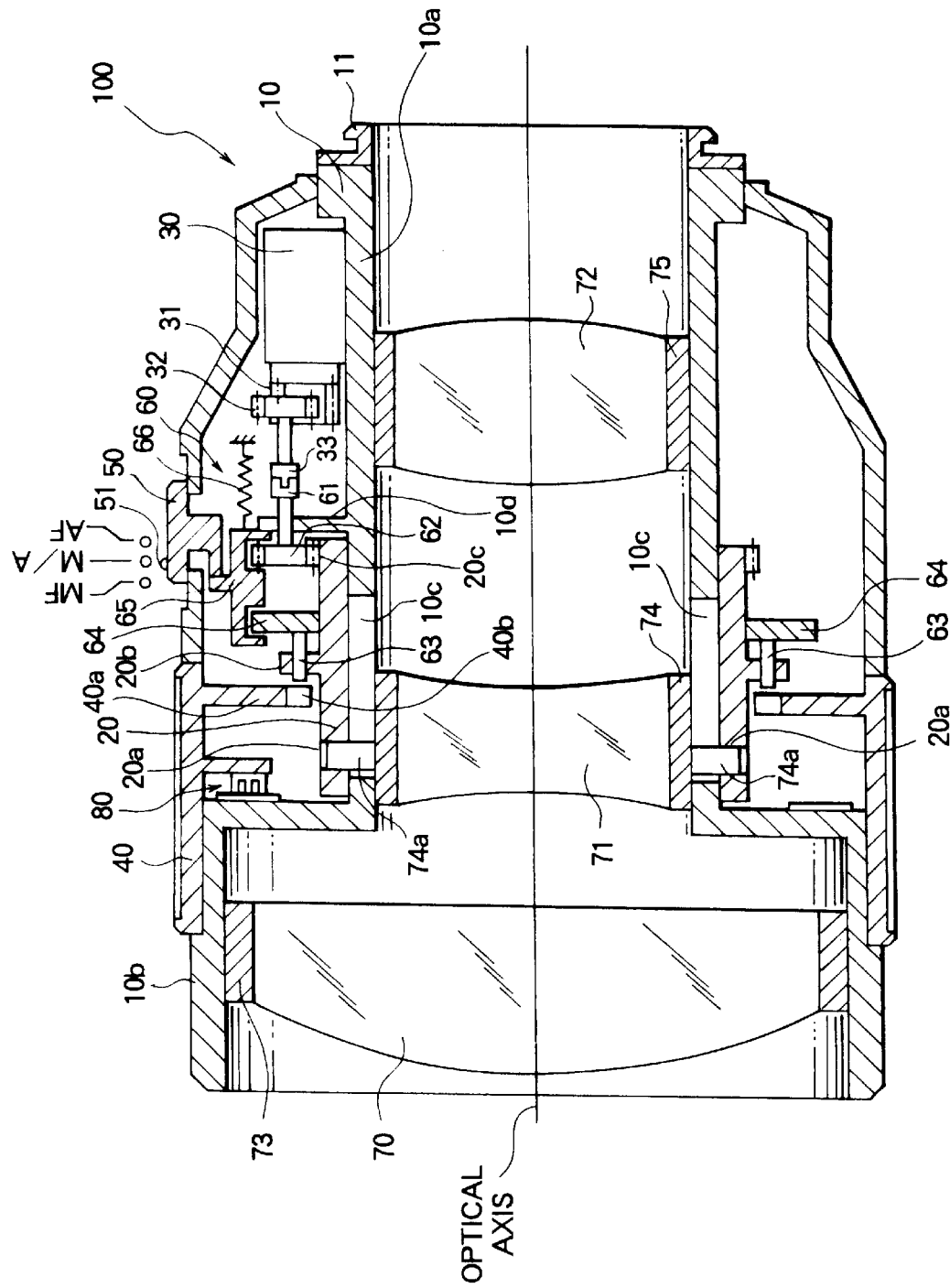
FIG. 1 is a vertical section view of a typical lens barrel of an embodiment of the present invention.

An example of a lens barrel of the present invention is shown in FIG. 1.

Figure 6:
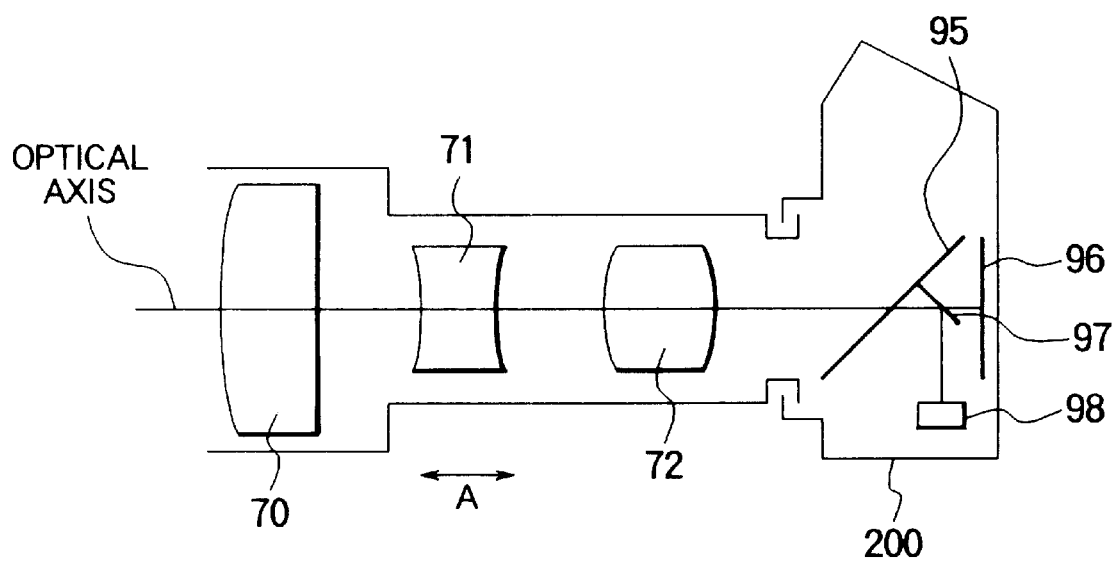
FIG. 6 is a block diagram showing an optical system provided in the camera of the embodiment of the present invention.

In a lens barrel 100 shown in the drawing, any of the following three modes is set: an automatic focusing exclusive mode (AF mode) for enabling only automatic focusing to he performed when the lens barrel is loaded in a camera body 200 shown in FIG. 6, a manual focusing exclusive mode (MF mode) for enabling only manual focusing to be performed and a manual preference automatic focusing mode (M/A mode) for enabling lens driving to be performed depending on the operation amount of an operation ring 40 when the operation ring 40 is operated although automatic focusing can be performed. The operation ring 40 is a focus ring rotated when a user performs focusing.

Figure 2:
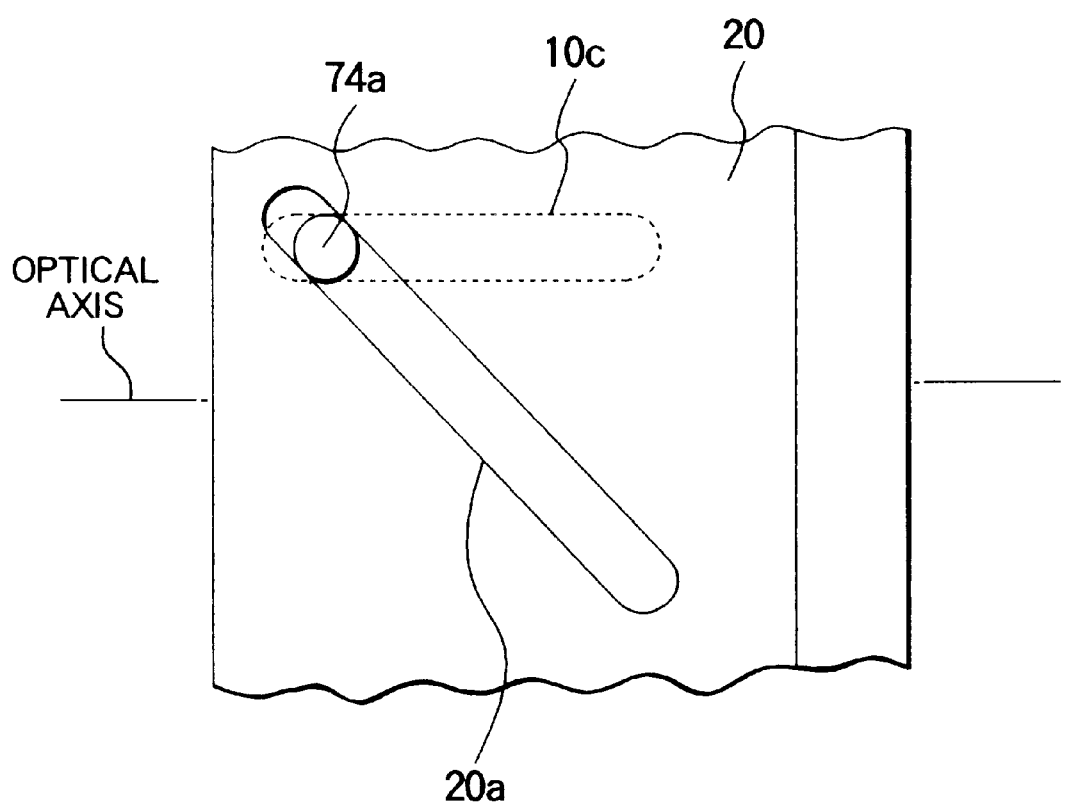
FIG. 2 is a partial view of a portion of a cam mechanism provided in the lens barrel shown in FIG. 1.

The lens barrel 100 is specifically composed of a fixed barrel 10 fixed on the camera body 200, a cam barrel 20 fitted in the outer periphery of the small diameter portion 10a of the fixed barrel 10 so as to be rotated, a motor 30 similarly fixed to the outer periphery of the small diameter portion 10a by using a screw, and so on, the operation ring 40 fitted in the outer periphery of the large diameter portion 10b of the fixed barrel 10 so as to be rotated, a switching member 50 similarly attached to the outer periphery of the large diameter portion 10b so as to be slid, a clutch mechanism 60 for switching a place for connection of the cam barrel 20 with another according to the setting position of the switching member 50 and three lens groups (first, second and third lens groups 70, 71 and 72). A mount 11 is provided in the fixed barrel 10. The mount 11 enables the fixed barrel 10 to be attached to the camera body 200 so as to be attached/detached. A gear 32 is engaged with a gear 31 provided in the shaft of the motor 30. A coupler 33 is provided in the gear 32. The first, second and third lens groups 70, 71 and 72 are sequentially held by lens group holding barrels 73, 74 and 75. The lens group holding barrels 73 and 75 are fixed in the inner periphery of the fixed barrel 10. The lens group holding barrel 74 is fitted in the inner periphery of the fixed barrel 10 so as to be slid. A cam pin 74a is provided in the outer periphery of the lens group holding barrel 74. The cam pin 74a is inserted into both of a straight advance groove 10c formed in the fixed barrel 10 and a cam groove 20a formed in the cam barrel 20. FIG. 2 illustrates this portion in development.

As shown in FIG. 2, a straight advance groove 10c is formed in parallel with an optical axis. The cam groove 20a is used to decide the moving locus of the lens group holding barrel 74 (second lens group 71) during focusing and is formed so as to intersect the straight advance groove 10c. More particularly, when the cam barrel 20 is rotated around the optical axis, the cam pin 74a of the lens group holding barrel 74 is moved along the straight advance groove 10c and the second lens group 71 is moved in the optical axis direction without being rotated around the optical axis. Then, focusing of the lens barrel 100 is thereby performed. For the first and third lens groups 70 and 72, since each lens group holding barrel is fixed to the inner periphery of the fixed barrel 20, the positions of these lens groups are not changed.

Referring again to FIG. 1, the clutch mechanism 60 will be described.

The clutch mechanism 60 includes a gear 62 having a coupler 61, a clutch ring 64 having a pin 63 which penetrates the flange portion 20b of the cam barrel 20, and an engaging member 65 fixed to the switching member 50 and engaged with both of the gear 62 and the clutch ring 64. A spring 66 whose one end portion is fixed to the fixed barrel 10 is attached to the engaging member 65. By the force of the spring 66, the engaging member 65 is always kept in the form of being pulled toward the right side of the drawing. Since a stopper 10d is provided in the fixed barrel 10, the movement of the engaging member 65 farther than this stopper 10d is prevented. A projection 40a facing inward is formed in the operation ring 40. For the projection 40a, a portion positioned in the front of the pin 63 is notched.

The gear 62 is engaged with a gear portion 20c formed in the outer periphery of the cam barrel 20. A clutch ring 64 is fitted to the outer periphery of the cam barrel 20. These members can be slid on the cam barrel 20 in parallel with the optical axis. Accordingly, when the switching member 50 is slid, the gear 62 and the clutch ring 64 are moved in the same direction as that for the switching member 50 together with the engaging member 65.

A small switch 51 is provided in the upper surface of the switching member 50. Switching among the AF, MF and M/F modes is performed through this switch. For the switching member 50, the switch 51 can be moved only between two positions set beforehand on the switching member 50. For example, if the switching member 50 is located in a position shown in FIG. 1 because of the action of the stopper 10d, the switch 51 can be moved only between two positions, that is, an AF mode setting position and a M/A mode setting position. On the other hand, if the switch 51 is to be set in a M/F mode setting position, the switching member 50 itself is moved to the left side while the switch 51 is kept in the condition shown in FIG. 1.

If the switching member 50 is located in a position shown in FIG. 1 (i.e., the switch 51 is set to any of the AF mode and the M/F mode), the couplers 33 and 61 are in an interconnected state and the tip portion of the pin 63 of the gear 64 is positioned in front of the notch 40b of the projection 40a. On the other hand, if the switching member 50 is moved from the position shown in FIG. 1 to the left side (i.e., the switch 50 is set to the MF mode), the couplers 33 and 61 are disconnected from each other and the tip portion of the pin 63 is arranged inside the notch 40b of the projection 40a.

Next, the detecting means for detecting the operation amount of the operation ring 40 (rotary encoder 80 in the case of the embodiment) will be described.

Figure 3:
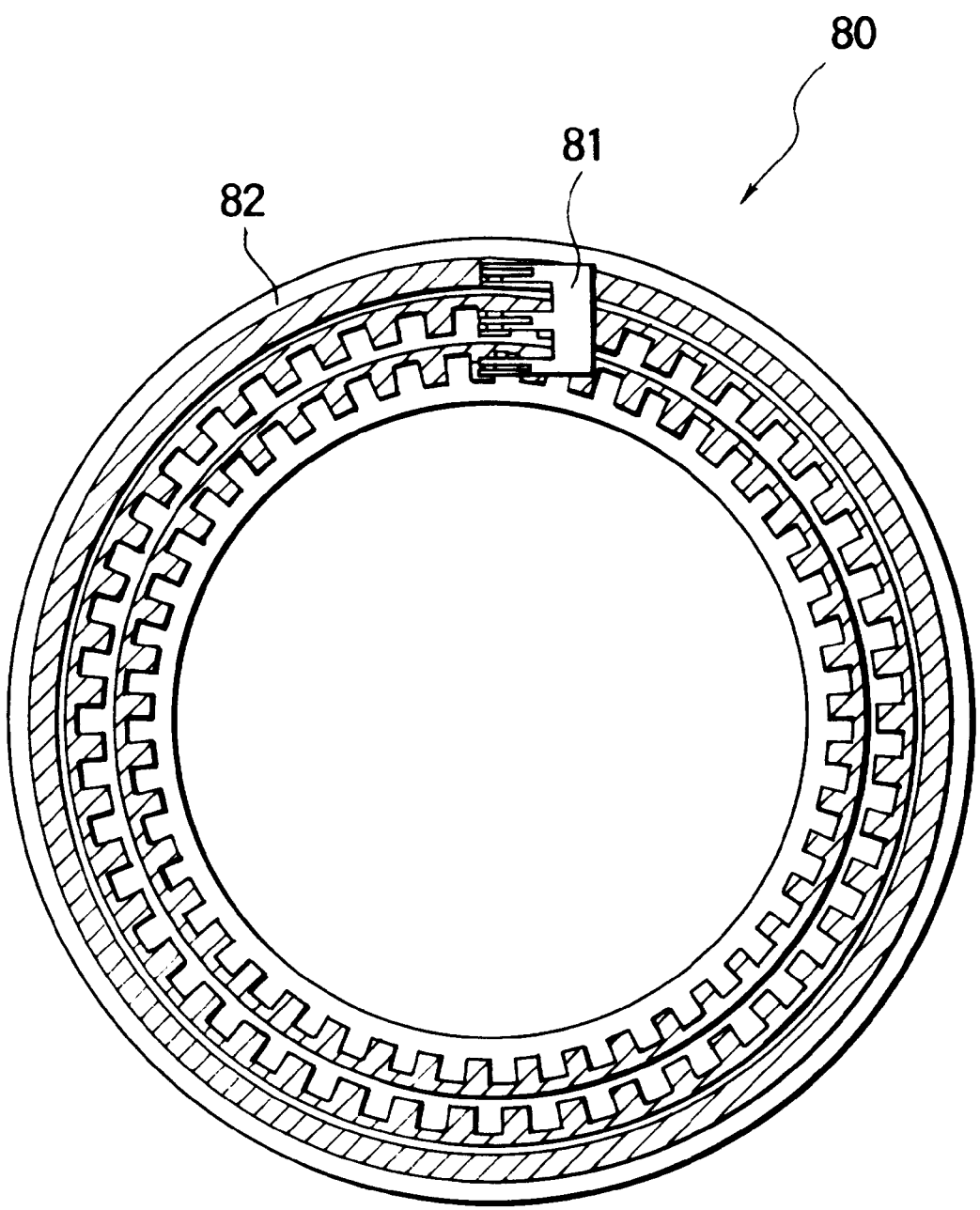
FIG. 3 is a constitutional view of a rotary encoder provided in the lens barrel shown in FIG. 1.

The rotary encoder 30 is provided between the fixed barrel 10 and the operation ring 40 and its specific constitution is shown in FIG. 3.

Figure 4:
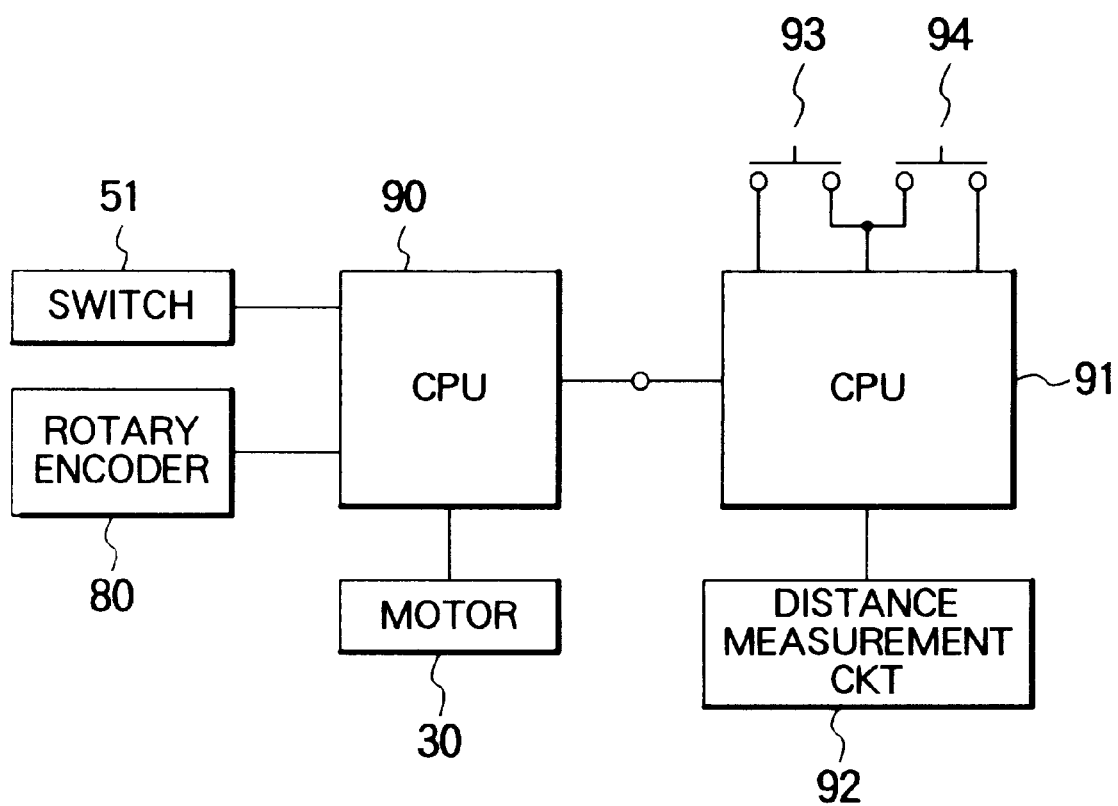
FIG. 4 is a block diagram showing a control system provided in a camera of the embodiment of the present invention.

Specifically, the rotary encoder 80 is composed of a brush 81 attached to the operation ring 40 and an annular substrate 82 attached to the fixed barrel 10. As conductor portions, three kinds of patterns are printed in the annular substrate 82 in a peripheral direction. The pattern located in an outermost position is a ground pattern, the pattern in its inside is an A phase pulse pattern and the pattern in the inside of the A phase pulse pattern is a B phase pulse pattern. In each of the A phase and B phase pulse patterns, conductive portions and non-conductive portions are alternately formed and as shown in the drawing, these portions are arranged so that they shift from one another. The tip of the brush 81 is divided into three portions, and when the operation ring 40 is rotated, these three portions are slid on the corresponding patterns. In addition, as shown in FIG. 4, the metallic patterns of the brush 81 and the annular substrate 82 are electrically connected to a lens side CPU 90. The lens side CPU 90 is incorporated in the lens barrel 100. However, this CPU 90 is not shown for the purpose of preventing the complexity of the drawing.

Figure 5A:
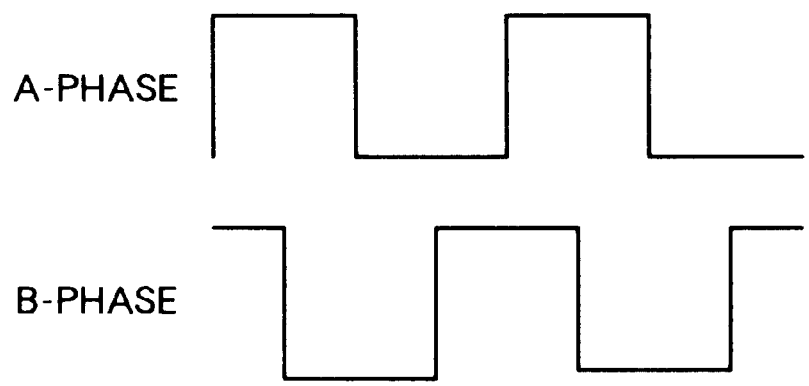
FIGS. 5(A) and 5(B; are views each illustrating a wave form of a signal output from the rotary encoder shown in FIG. 3.
Figure 5B:
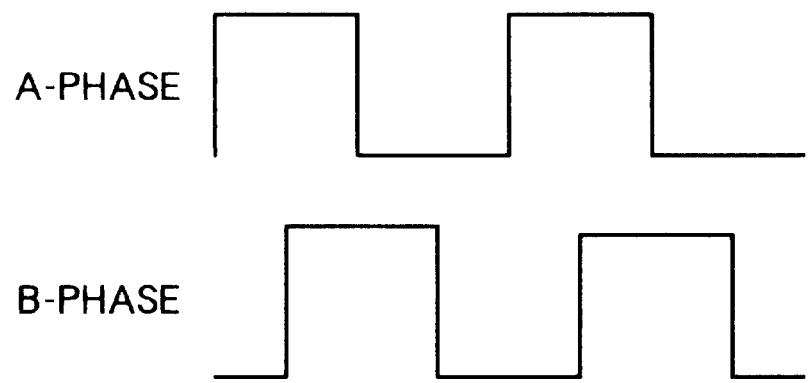

When the operation ring 40 is rotated, two pulse signals like those shown in FIG. 5(A) or those shown in FIG. 5(B) are output from the rotary encoder 80. Specifically, the two pulse signals shown in FIG. 5(A) are output when the brush 81 is moved in a clockwise direction in FIG. 3. The two pulse signals shown in FIG. 5(B) are output when the brush 81 is moved in a counterclockwise direction in FIG. 3. The lens side CPU 90 detects the rotational direction of the operation ring 40 based on a phase shift between the two pulse signals output from the rotary encoder 80 (i.e., A phase pulse signal output by the sliding of the brush 81 on the A phase pulse pattern and B phase pulse signal output by the sliding of the brush 81 on the B phase pulse pattern). The lens side CPU 90 computes the rotational speed of the operation ring 40 based on a pulse cycle.

In addition to the rotary encoder 80, the switch 51 and the motor 30 are connected to the lens side CPU 90. A body side CPU 91 is incorporated in the camera body 200 and if the lens barrel 100 is loaded in the camera body 200, this body side CPU 91 is also electrically connected to the lens side CPU 90. Switches 93 and 94 operated in association with a release button (not shown) and a distance measurement circuit 92 are connected to the body side CPU 91. The switch 93 is switched ON when the release button is pressed by a half and the switch 94 is switched ON when the release button is fully pressed.

FIG. 6 illustrates in outline the structure of a portion, regarding focus detection, of an optical system incorporated in the camera.

Referring to FIG. 6, each of the first, second and third lens groups 70, 71 and 72 is the same as that described above. A photographic light obtained through each of these lens groups is made incident on a main mirror 95 in the camera body 200. A portion of the light having been made incident on the main mirror 95 is passed through the main mirror 95 and divided into more portions in a sub mirror 97. One of the divided light is sent to a film surface 96 and the other of the divided light is made incident on a sensor module 98. A range finder element as one portion of the distance measurement circuit 92 is incorporated in the sensor module 98. A light having been made incident on the sensor module 98 is received by the range finder element.

Figure 7:
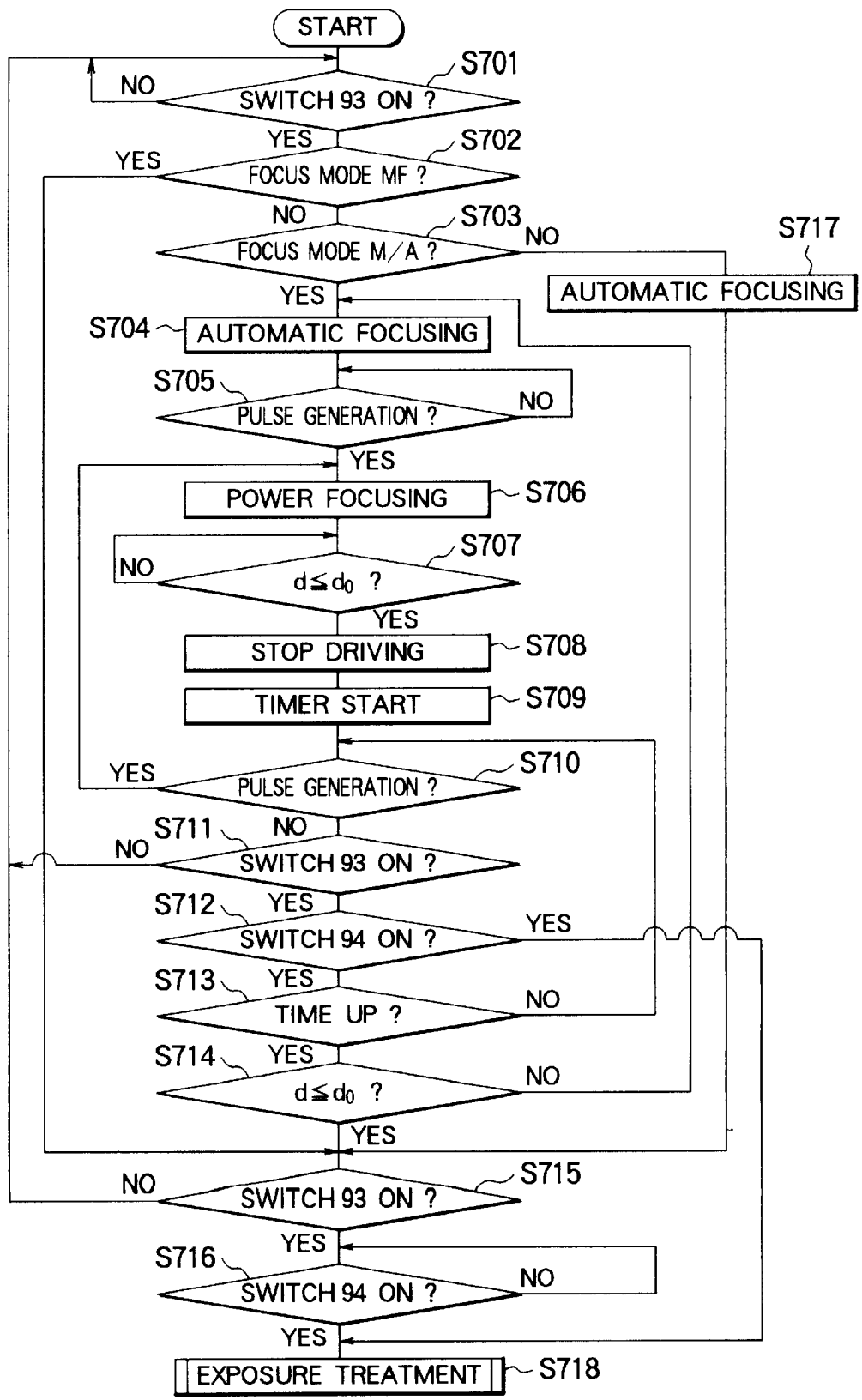
FIG. 7 is a flow chart illustrating a focusing operation performed in the camera of the embodiment of the present invention.

Next, the operation of each portion of the camera of the embodiment which is composed of the lens barrel 100 and the camera body 200 will be described. When a main switch (not shown) is switched ON in the camera, processing is carried out based on steps illustrated by the flow chart of FIG. 7.

In step S701, half pressing of the release button (whether the switch 93 has been switched ON or not) is detected. This detection is executed by the body side CPU 91 based on the ON/OFF signal of the switch 93. If it is discovered that the release button has been pressed by a half, the process proceeds to step S702.

In step S702, determination is made as to whether a currently set mode is a MF mode or not. If the current mode is not set to the MF mode, the process proceeds to step S703. If the current mode is in the MF mode, the process proceeds to step S715.

In step S703, determination is made as to whether a currently set focus mode is a M/A mode or not. If the current focus mode is set to the M/A mode, the process moves ahead to step S704. If the current focus mode is not in the M/A mode, the process proceeds to step S717.

From the switch 51 of the lens barrel 100, a signal corresponding to its set position is output to the lens side CPU 90. The determination of a currently set focus mode is executed by the lens side CPU 90 based on this signal. The result of this determination is sent to the body side CPU 91. Setting of each of the MF, AF and M/A modes is performed by the emphasizing operations of the lens side CPU 90 and the camera side CPU 91 at the time of switching of the switch 51. In other words, these CPUs function also as mode setting means.

In step S704, automatic focusing is performed.

Specifically, first, upon receipt of a detected signal output from the distance measurement circuit 92, the body side CPU 91 computes a defocusing amount and then the driving amount of the motor 30 based on the result of this calculation. The driving amount computed by the body side CPU 91 is transmitted to the lens side CPU 90. The lens side CPU 90 drives the motor 30 by using this driving amount.

After the motor 30 has been driven, the rotational force of the motor shaft is transmitted to the gear 62 through the couplers 61 and 63 which have been connected to each other. Then, the gear 62 rotates the cam barrel 20. The second lens group is moved in the optical axis direction according to the rotational amount of this cam barrel 20 whereby focusing has been completed.

In step S705, detection of a pulse signal output from the rotary encoder 80 is performed. When the operation ring 40 is rotated, a pulse signal is output from the rotary encoder 80 in accordance with the operation amount of the operation ring 40. Upon receipt of this pulse signal, the lens side CPU 90 drives the motor 30 based on this pulse signal. In other words, even while the operation ring 40 is rotated by a user, actual lens driving is executed by the motor 30 as diving force generating means according to the rotational direction and speed of the operation ring 40. Focusing carried out by driving the lens according the operation amount of the operation ring may be referred to as, for instance, power focusing. Switching from automatic focusing to power focusing can be made not only when the user is not satisfied with the level of focusing although automatic focusing has been executed, but also when the user cannot wait for the end of lens driving by automatic focusing.

In step S707, the body side CPU 91 determines whether a computed defocusing amount ( d ) is equivalent to a preset value ($d_0$) or lower. The preset value ($d_0$) specifically means a value corresponding to the focal depth of the lens system provided in the lens barrel 100. A focal depth is computed from an F value (diaphragm stop) and an permissible circle diameter of confusion based on the following expression:

(focal depth) =

($F$ value (diaphragm stop)) × (permissible circle diameter of confusion)

If a defocusing amount (d) is equal to a preset value ($d_0$) or lower, since further focusing is unnecessary, the body side CPU 91 notifies the lens side CPU 90 of this fact. Then, the lens side CPU 90 forcibly stops the driving of the motor 30 in step S708. Accordingly, even if the user does not perform work for confirming focusing for a subject, a focus is adjusted for the subject.

In step S709, a timer (not shown) provided in the lens side CPU 90 starts time measuring.

In step S710, detection of a pulse signal from the rotary encoder 80 is performed. When the pulse signal is detected, power focusing in step S706 is performed. Although lens driving is temporarily stopped in step S708, if the operation ring 40 is operated again, the power focusing of step S706 is performed. On the other hand, when the pulse signal is not detected, the process moves ahead to step S711.

In step S711, detection of the half pressing of the release button is performed. If the half pressing of the release button is detected, the process proceeds to step S712 arid after the half pressing of the release button is released, the process returns to step S701.

In step S712, detection of the full pressing of the release button is performed. If the full pressing of the release button is detected, exposure processing is executed (step S718). In the exposure processing of step S718, a shutter operation, and so on, are performed. However, the description of these operations will be omitted since the operations are not directly related to the present invention.

In step S713, determination is made as to whether specified time (e.g., 2 second) has passed or not after starting of the timer. If the passage of specified time is determined, in step S714, processing similar to that of step S707 is executed. If about 2 seconds have passed after starting of the timer, since the subject may have been moved and thus focusing may have been shifted, as in the case of processing in step S707, determination is made as to whether a defocusing amount (d) is equal to a preset value ($d_0$) or lower. If d is larger than $d_0$, automatic focusing is performed in step S704. On the other hand, if d is equal to $d_0$ or lower, detection of the half pressing of the release button is performed in step S715. If the half pressing of the release button is detected, the process proceeds to step S716. Then, after the half pressing of the release button is released, the process returns to step S701.

In step S716, detection of the full pressing of the release button is performed. If the full pressing of the release button is detected, exposure processing (step S718) is executed.

If it is determined that a currently set focusing mode is neither a M/A mode nor a MF mode (i.e., in an AF mode), the processing of step S717 is executed. In step S717, automatic focusing similar to that in step S704 is performed.

If it is determined that a currently set focusing mode is a MF mode in step S702, the coupler 33 and the coupler 61 are disconnected from each other in the MF mode and the pin 63 of the gear 64 is arranged in the notch 40*b* of the projection 40*a*. Accordingly, when the operation ring 40 is operated, this rotational force is transmitted to the cam barrel 20, resulting in completion of focusing.

According to the embodiment of the present invention, when focusing is to be performed by the operation ring in the manual preference automatic focusing mode, since it is not necessary for the user side to determine focusing, quick focusing can be performed.

Figure 8:
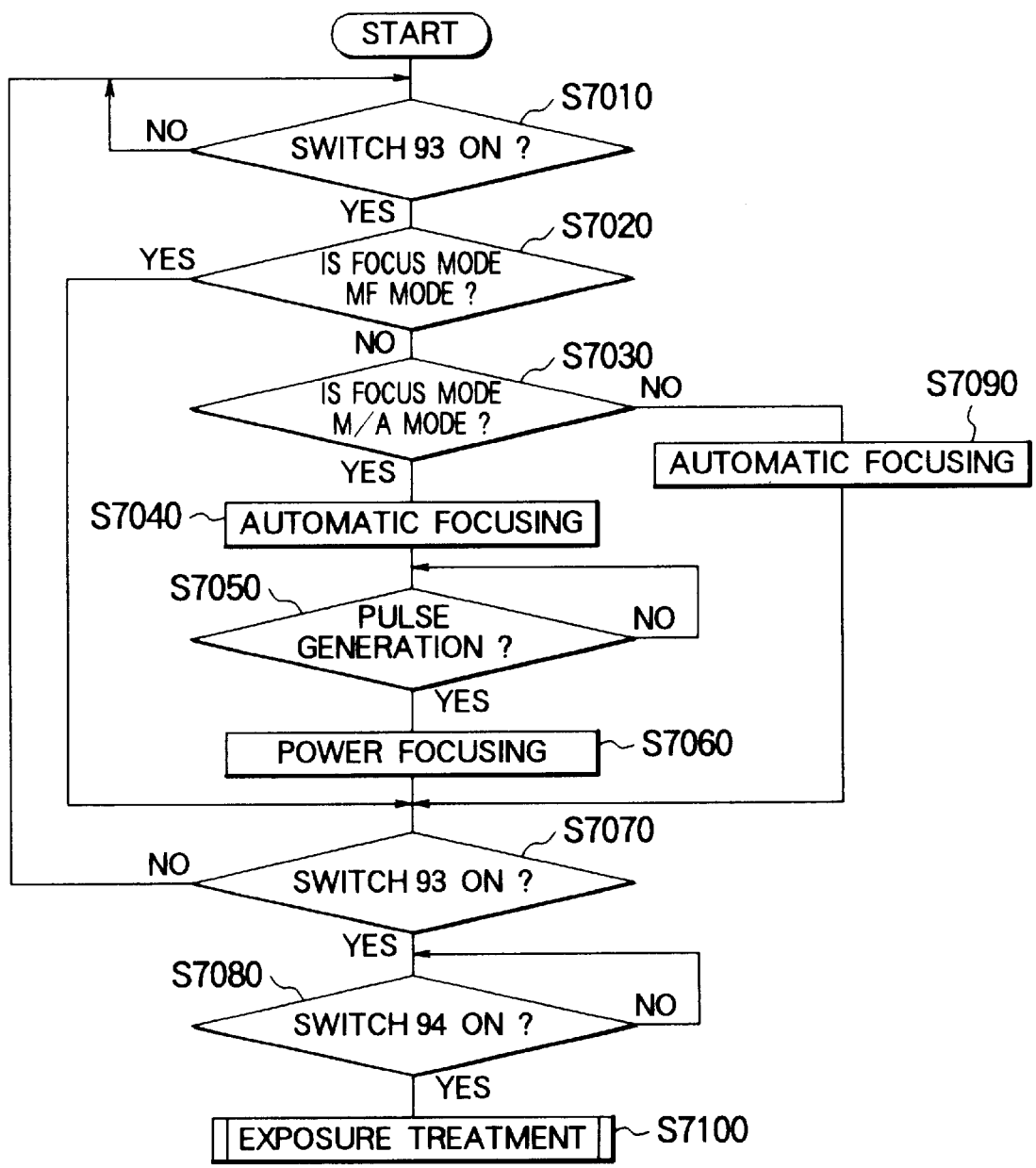
FIG. 8 is a flow chart illustrating another focusing operation performed in the camera of the embodiment of the present invention.

Next, another operation of each portion of the camera of the embodiment, which is composed of the lens barrel 100 and the camera body 200, will be described. In the camera, after switching ON of the main switch (not shown), the process based on the flow chart of FIG. 8 will be performed.

In step S7010, detection of the half pressing of the release button (switching ON of the switch 93) is performed. This detection is executed by the body side CPU 91 based on the ON/OFF signal of the switch 93. If the half pressing of the release button is detected, the process moves ahead to step S7020.

In step S7020, determination is made as to whether a currently set focusing mode is a MF mode or not. If the mode is set to the MF mode, the process proceeds to step S7030.

In step S7030, determination is made as to whether a currently set focusing mode is a M/A mode or not. If the mode is set to the M/A mode, the process proceeds to step S7040.

From the switch 51 of the lens barrel 100, a signal corresponding to its setting position is output to the lens side CPU 90. The determination of a currently set focusing mode is executed by the lens side CPU 90 based on this signal. The result of this determination is sent to the body side CPU 91. Setting of each of the MF, AF and M/A modes is performed by the emphasizing operations of the lens side CPU 90 and the camera side CPU 91. In other words, these CPUs function also as mode setting means.

In step S7040, automatic focusing is performed.

Specifically, first, upon having received a detected signal from the distance measurement circuit 92, the body side CPU 91 computes a defocusing amount and then the driving amount of the motor 30 based on this calculation result. The driving amount computed by the body side CPU 91 is transmitted to the lens side CPU 90. Then, the lens side CPU 90 drives the motor 30 by using this driving amount.

After the motor 30 has been driven, the rotational force of the motor shaft is transmitted through the couplers 61 and 63 connected to each other to the gear 62. Then, the gear 62 rotates the cam barrel 20. The second lens group is moved in the direction of optical axis according to the rotational amount of this cam barrel 20. Accordingly, focusing has been completed.

In step S7050, detection of a pulse signal from the rotary encoder 80 is performed. When the operation ring 40 is rotated, a pulse signal is output from the rotary encoder 80 according to the operation amount of the operation ring 40. Upon receipt of this pulse signal, the lens side CPU 90 drives the motor 30 based on the pulse signal. In other words, even if the operation ring 40 is rotated by the user, actual lens driving is performed by the motor 30 as driving force generating means in response to the rotational direction and speed of the operation ring 40. Focusing in which the lens is driven by the motor depending on the operation amount of the operation ring 40 may be referred to as, for instance power focusing.

Thus, according to the embodiment of the present invention, when switching is to be made from automatic focusing to manual focusing in the manual preference automatic focusing, it is not necessary to actuate any mechanical means. Accordingly, a time for mode switching is shortened and the mechanism of the lens barrel can be simplified.

In step S7070, detection of the half pressing of the release button is performed. In step S7080, detection of the full pressing of the release button is performed. This detection is executed by the lens side CPU 91 based on the ON/OFF signals of the switches 93 and 94. If the full pressing of the release button is determined, the process moves ahead to step S7100.

In step S7100, general exposure processing is performed.

If in step S7020 and step S7030, it is determined that a currently set focusing mode is neither a M/A mode nor a MF mode (i.e., in an AF mode), the processing of step S7090 is executed. In step S7090, automatic focusing similar to that of step S7040 is performed.

If in step S7020, it is determined that a currently set focusing mode is a MF mode, the process proceeds to step S7070.

In the MF mode, the coupler 33 and the coupler 61 are disconnected from each other and the pin 63 of the gear 64 is arranged inside the notch 40*b* of the projection 40*a*. Accordingly, when the operation ring 40 is operated, the rotational force thereof is transmitted to the cam barrel 20 and focusing has been performed.

According to the embodiment of the present invention, although automatic focusing can be performed, if the operation ring is operated in the mode for driving the lens depending on the operation amount of the operation ring (manual preference automatic focusing mode), the driving force generating means drives the lens. This driving force generating means is also a driving source during automatic focusing.

As apparent from the foregoing, switching between the lens driving in the automatic focusing mode and the lens driving based on the operation amount of the operation ring can be smoothly performed without using any complex mechanisms.

Although the preferred embodiment of the present invention has been described in detail, it should be understood that various changes, substitutions and alternations can be made therein without departing from spirit and scope of the inventions as defined by the appended claims.

What is claimed is:

1. A lens driving device, comprising:

an operation portion operated for the purpose of focusing;

an operation amount detecting device for detecting an operation amount of said operation portion;

a driving device for performing lens driving depending on an operation amount detected by said operation amount detecting device;

a focusing condition detecting device for detecting a focusing condition at least during said lens driving; and a controller for forcibly stopping said lens driving performed by said driving device when said focusing condition detected by said focusing condition detecting device becomes a predetermined state, wherein said controller selectively performs automatic focusing control in which said driving device is controlled according to a detected result of said focusing condition detecting device and power focusing control in which said driving device is controlled according to a detected result of said operation amount detecting device, and wherein said predetermined state of said focusing condition is realized when a defocusing amount corresponding to a focal depth of a lens is at least one of a predetermined value or lower.

2. A lens driving device according to claim 1, wherein said operation amount detecting device includes a rotary encoder for detecting a rotational direction and a rotational speed.

3. A lens driving device, comprising:

an operation portion operated for the purpose of focusing;

an operation amount detecting device for detecting an operation amount of said operation portion;

a driving device for performing lens driving;

a focusing condition detecting device for detecting a focusing condition; and a controller for selectively performing automatic focusing control in which said driving device is controlled according to a detected result of said focusing condition detecting device and power focusing control in which said driving device is controlled according to a detected result of said operation amount detecting device, wherein said controller forcibly stops lens driving performed by said driving device when said focusing condition detected by said focusing condition detecting device becomes a predetermined condition during performing of said power focusing control, and wherein said controller includes a first switching portion for switching control of said driving device from said automatic focusing control to said power focusing control during performing of said automatic focusing control; a timer portion for starting measuring from a point of time when said lens driving is forcibly stopped, after control of said driving device is switched from said automatic focusing control to said power focusing control; and a second switching portion for switching control from said power focusing control to said automatic focusing control when measuring time of said timer portion reaches a predetermined value.

4. A lens driving device, comprising:

an operation portion operated for the purpose of focusing;

an operation amount detecting device for detecting an operation amount of said operation portion;

a driving device for performing lens driving;

a focusing condition detecting device for detecting a focusing condition; and a controller for selectively performing automatic focusing control in which said driving device is controlled according to a detected result of said focusing condition detecting device and power focusing control in which said driving device is controlled according to a detected result of said operation amount detecting device, wherein said controller forcibly stops lens driving performed by said driving device when said focusing condition detected by said focusing condition detecting device becomes a predetermined condition during performing of said power focusing control, and wherein said predetermined state of said focusing condition is realized when defocusing amount corresponding to a focal depth of a lens is at least one of a predetermined value or lower.

5. A lens driving device according to claim 3, wherein said operation amount detecting device includes a rotary encoder for detecting a rotational direction and a rotational speed.

* * * * *